United States Patent [19]

Schnetzka, II et al.

[11] Patent Number: 5,075,838
[45] Date of Patent: Dec. 24, 1991

[54] ENERGY EFFICIENT VOLTAGE SNUBBER CIRCUIT

[75] Inventors: Harold R. Schnetzka, II, Spring Grove; Frank E. Wills, York, both of Pa.

[73] Assignee: York International Corporation, York, Pa.

[21] Appl. No.: 507,238

[22] Filed: Apr. 10, 1990

[51] Int. Cl.$^5$ .................... H02M 5/45; H02H 7/122
[52] U.S. Cl. .................................. 363/37; 363/56; 363/58; 363/137
[58] Field of Search ............... 363/56, 57, 58, 132, 363/136, 137

[56] References Cited

U.S. PATENT DOCUMENTS

| | | | |
|---|---|---|---|
| 4,403,269 | 9/1983 | Carroll | 361/91 |
| 4,438,486 | 3/1984 | Ferraro | 363/56 |
| 4,489,373 | 12/1984 | du Parc | 363/56 |
| 4,542,440 | 9/1985 | Chetty et al. | 361/111 |
| 4,561,046 | 12/1985 | Kuster | 363/21 |
| 4,607,322 | 8/1986 | Henderson | 363/56 |
| 4,611,267 | 9/1986 | McMurray | 363/58 |
| 4,626,980 | 12/1986 | McGuire | 363/56 |
| 4,675,796 | 6/1987 | Gautherin et al. | 363/20 |
| 4,691,270 | 9/1987 | Pruitt | 363/56 |
| 4,853,836 | 8/1989 | Furuhashi et al. | 363/58 |

FOREIGN PATENT DOCUMENTS

| | | |
|---|---|---|
| 3714175 | 11/1988 | Fed. Rep. of Germany . |
| 3717488 | 12/1988 | Fed. Rep. of Germany . |
| 182473 | 10/1983 | Japan ........................... 363/57 |
| 44978 | 3/1984 | Japan ........................... 363/136 |
| 74974 | 4/1985 | Japan ........................... 363/135 |
| 117668 | 5/1988 | Japan . |

OTHER PUBLICATIONS

"Designing Optimum Snubber Circuits for the Transistor Bridge Configuration", by Pearson et al., Proceedings of Powercon, 9, 1982, pp. 1, 7–11.
Hitachi—GTO Thyristor Operation Manual, pp. 8-9 (undated).
Hitachi Research Laborary Document, pp. 218-236, 1983.

*Primary Examiner*—William H. Beha, Jr.
*Attorney, Agent, or Firm*—Finnegan, Henderson, Farabow, Garrett & Dunner

[57] ABSTRACT

A snubber circuit for use with a power seimconductor switching device of a power converting circuit. The snubber circuit includes a snubber capacitor, coupled across the switching device for charging with current bypassing the switching device when the switching device is turned off. The snubber circuit also includes a transformer having a primary winding coupled in series with the snubber capacitor to conduct the flow of current discharged by the snubber capacitor when the switching device is turned on. The snubber circuit further includes an inductor, coupled in series with a secondary winding of the transformer, for regulating the flow of discharged current from the capacitor. The snubber circuit is coupled to return the energy discharged from the snubber capacitor to a power source to which the power converting circuit is coupled.

34 Claims, 10 Drawing Sheets

ENERGY EFFICIENT VOLTAGE SNUBBER CIRCUIT

BACKGROUND OF THE INVENTION

The present invention is related in general to snubber circuits for semiconductor switching devices in a power converting circuit and, more particularly, to a snubber circuit for transferring energy accumulated in a snubber circuit to a power source to which the power converting circuit is connected.

BACKGROUND OF THE INVENTION

Power converting circuits as known in the art include AC-to-DC inverter circuits, DC-to-DC converting circuits and AC-to-AC converting circuits. In each such circuit, one or more semiconductor switching devices are coupled between an input and an output of the power converting circuit. The input of the power converting circuit is coupled to a power source, such as a battery, the output of a rectifier circuit, or a three-phase AC source. The output of the power converting circuit is coupled to an electrical load to which the power provided by the power converting circuit is to be delivered. The switching devices of the power converting circuit are selectively controlled to switch on and off to condition the power received from the power source for delivery to the electrical load. For example, an AC-to-AC converting circuit may include a rectifier circuit for converting the three-phase AC input into a DC voltage. The switching devices of a three-phase inverter circuit having its input connected to receive the DC output of the rectifier circuit are connected and operated to provide a desired three-phase AC output.

The semiconductor switching devices utilized in power converting circuits can include thyristors, transistors, gate turn-off devices, MOSFETs and IGFETs. Power converting circuits typically include a snubber circuit connected across each semiconductor switching device. The snubber circuit operates to limit the rate of change of voltage across the switching device when the device is turned off, i.e., is opened. FIG. 1 illustrates a simplified representation of a typical snubber circuit 100 applied to a switching device 102. Device 102 may be provided as a gate turn-off device having an on-off state which is controlled by selectively applying a control signal to gate terminal 104. The load current conducted by device 102 is represented by current source 106. For simplicity, the remainder of the power converting circuit is not shown. Snubber circuit 100 consists of capacitor 110, resistor 112 and diode 114. When device 102 is turned off, current flow is diverted through diode 114 and through capacitor 110, thereby charging the capacitor. As a result, the voltage change rate across device 102 is suppressed. When device 102 is subsequently turned on, capacitor 110 discharges via the closed loop current path formed by capacitor 110, resistor 112 and device 102. As a result, the energy that was stored in capacitor 110 is dissipated by resistor 112. Resistor 112 limits the peak current conducted by device 102 due to the discharge of capacitor 110. Snubber circuit 100 therefore suffers the drawback of dissipating energy and thereby rendering the operation of the power converting circuit less efficient.

It is therefore an object of the invention to provide a snubber circuit, for application to the switching devices of a power converting circuit, that operates more efficiently than the above described typical snubber circuit.

SUMMARY OF THE INVENTION

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims.

The present invention overcomes the problems and disadvantages of the prior art by providing a snubber circuit for use in a power converting circuit including an input for coupling to a source of power and an output for coupling to a load to which converted power is to be delivered. The power converting circuit further includes at least one power semiconductor switching device coupled between the input and the output of the converting circuit, the switching device being turned on and off to selectively conduct current through the power converting circuit. The snubber circuit comprises capacitance means, coupled across the switching device, for charging with current bypassing the switching device when the switching device is turned off and a transformer having a primary winding and a secondary winding. The primary winding is coupled in series with the capacitance means to conduct a flow of current discharged by the capacitance means when the switching device is turned on. The snubber circuit also comprises inductance means, coupled in series with the secondary winding of the transformer, for regulating the flow of discharge current from the capacitance means. Circuit means, coupled to the power converting circuit input and the inductance means, conducts the current flowing through the inductance means and the secondary winding of the snubber circuit, and returns energy stored in the capacitance means to the power source. As a result, energy stored in the capacitance means is transferred to the power source through the transformer and the inductance means when the switching device is turned on.

In one embodiment of the invention, the snubber circuit also includes means, coupled in series with the primary winding, for increasing a rate of depleting energy stored in the primary winding after the capacitance means has been discharged.

The invention is further directed to a power converting circuit comprising an input for coupling to a source of power, an output for coupling to a load to which converted power is to be delivered, and at least one power semiconductor switching device coupled between the input and the output of the power converting circuit, the switching device being turned on and off to selectively conduct current through the power converting circuit. The power converting circuit also includes snubber means, coupled to the switching device, for limiting a voltage change rate across the switching device when the switching device is turned off. The snubber means comprises capacitance means, coupled across the switching device, for charging with current bypassing the switching device when the switching device is turned off and a transformer having a primary winding and a secondary winding. The primary winding is coupled in series with the capacitance means to conduct a flow of current discharged by the capacitance means when the switching device is turned on. The snubber means also comprises inductance means, coupled in series with the secondary winding of the transformer, for regulating the flow of discharge current from the capacitance means. Circuit means, coupled to the power converting circuit input and the inductance means, conducts the current flowing through the inductance means and the secondary winding of the snubber circuit, and returns energy stored in the capacitance means to the power source. As a result, energy stored in the capacitance means is transferred to the power source through the transformer and the inductance means when the switching device is turned on.

The accompanying drawings, which are incorporated in and constitute a part of this invention, illustrate embodiments of the invention, and together with the description, serve to explain the principles of the invention.

DETAILED DESCRIPTION OF THE PREFERRED EMBODIMENT

Figure 1:
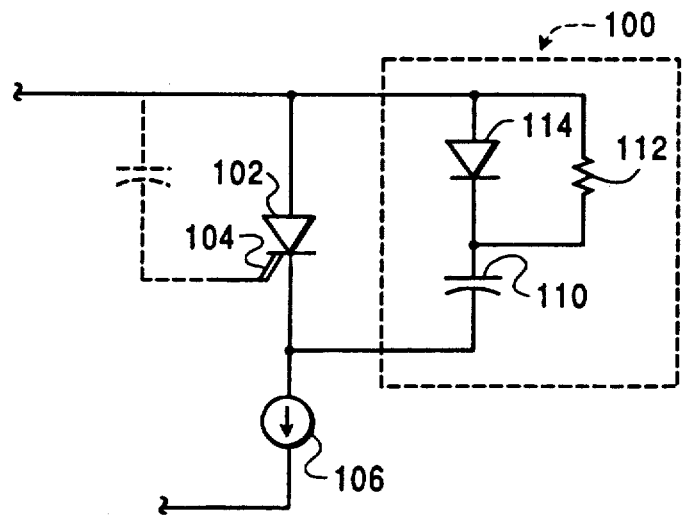
FIG. 1 illustrates a conventional snubber circuit.

Reference will now be made in detail to the present preferred embodiments of the invention, examples of which are illustrated in the accompanying drawings. Whenever possible, the same reference numerals will be used throughout the drawings to refer to the same or like parts.

Figure 2:
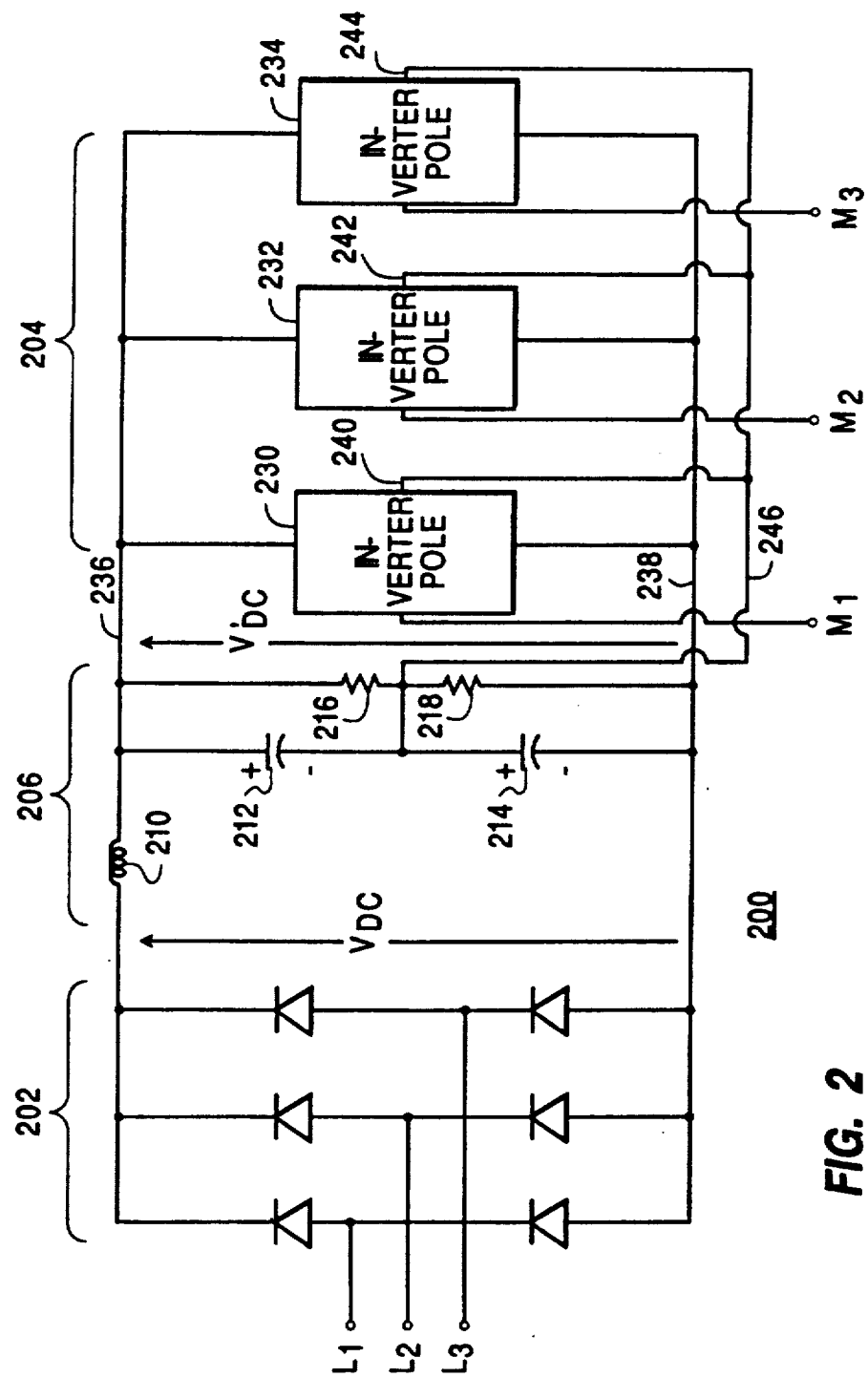
FIG. 2 illustrates a power converting circuit including a snubber circuit constructed in accordance with the present invention.

FIG. 2 illustrates an AC-to-AC power converting circuit 200 including a rectifier circuit 202 and a three-phase voltage source inverter circuit 204. Rectifier circuit 202 consists of a full-wave bridge rectifier that is adapted for connection to a three-phase AC voltage source via terminals $L_1$, $L_2$ and $L_3$. Rectifier circuit 202 provides a DC output voltage $V_{DC}$.

The output of rectifier circuit 202 is filtered by a filter circuit 206 coupled between rectifier circuit 202 and inverter circuit 204. Filter circuit 206 includes an inductor 210 and a filter capacitor bank consisting of capacitors 212 and 214. Filter circuit 206 further includes voltage grading resistors 216 and 218 for providing an even division of voltage between the filter capacitors. Filter circuit 206 provides a filtered DC voltage $V'_{DC}$. Exemplary values for the elements of filter circuit 206 are provided below.

Inverter circuit 204 further includes three inverter circuit poles 230, 232 and 234. The inputs of each pole are connected across the filtered DC voltage $V'_{DC}$ between DC input buses 236 and 238. The three-phase AC output of inverter circuit 204 is provided on inverter output terminals $M_1$, $M_2$ and $M_3$ to which an AC load would be connected. The inverter output is composed of one output leg of each inverter pole. Thus, inverter circuit 204 serves as a power inverting circuit, within circuit 200, for inverting a DC voltage to a three-phase AC voltage.

The present invention includes circuit means for conducting a flow of current between a snubber circuit associated with each switching device of a power converting circuit and a power source to which the input of the power converting circuit is coupled. As embodied herein, the circuit means is provided as a current path between each inverter pole and filter circuit 206. More specifically, second output legs 240, 242 and 244 of inverter poles 230, 232 and 234, respectively, are connected together and are connected through a conductive path 246 to a common point between capacitors 212 and 214. As is described more fully below, energy stored during the operation of the respective snubber circuits of the inverter poles is returned to capacitors 212 and 214 of filter circuit 206 via a current flow along a path including conductive path 246. In this respect, inverter circuit 204 is also considered a power converting circuit, and the energy stored in the snubber circuits is returned to filter circuit 206 which represents a portion of the power source to which inverter circuit 204 is coupled.

Figure 3:
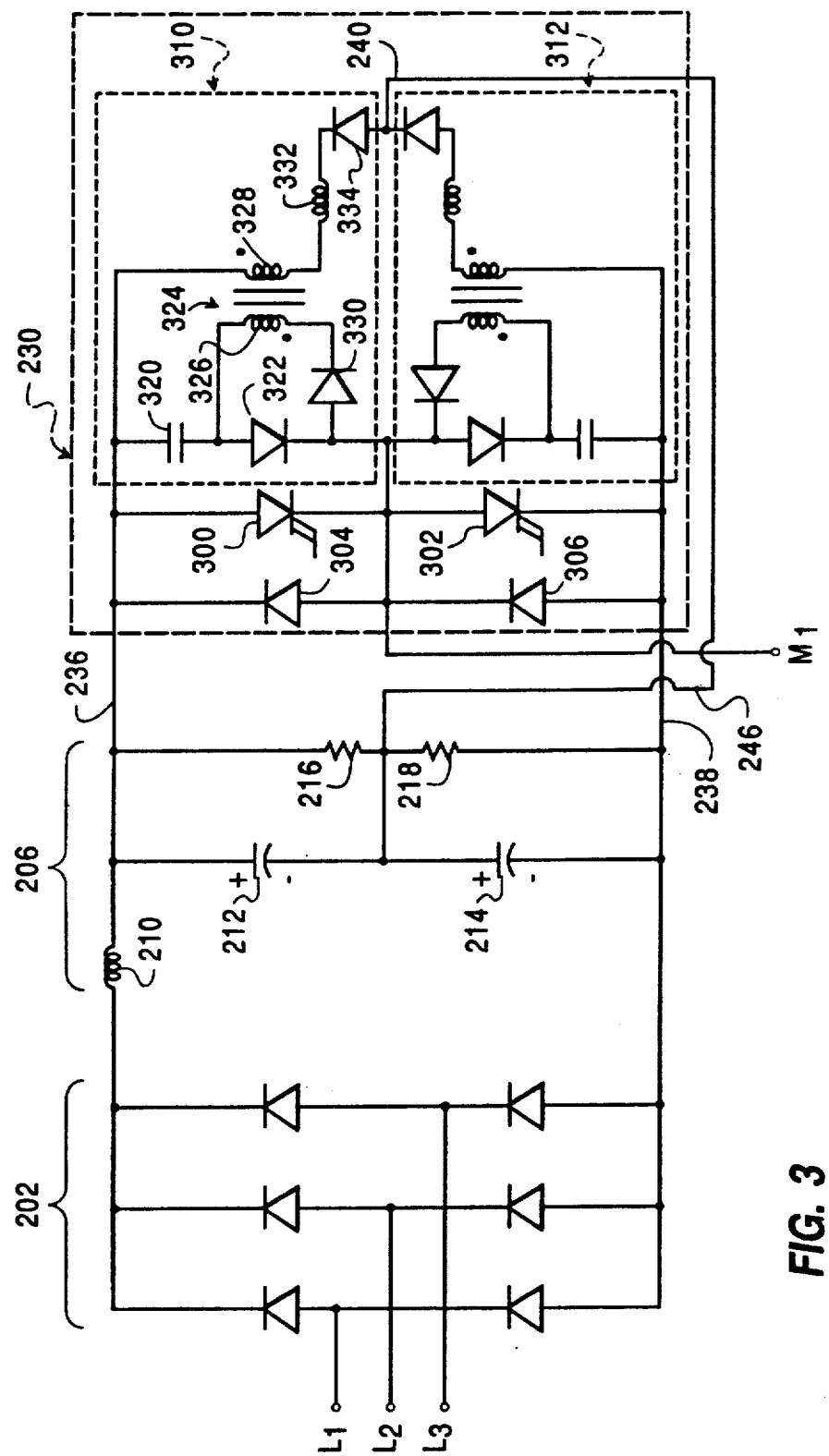
FIG. 3 illustrates an inverter pole, of the power converting circuit illustrated in FIG. 2, including a snubber circuit constructed in accordance with a first embodiment of the invention.

FIG. 3 illustrates the detailed construction of inverter pole 230 and its connection to input filter section 206. Inverter poles 232 and 234 are constructed substantially identically to inverter pole 230, so that the description of inverter pole 230 is equally descriptive of inverter poles 232 and 234.

Inverter pole 230 includes two semiconductor switching devices that are provided in the illustrated embodiment as gate turn-off devices 300 and 302. However, the two switching devices of each inverter pole can be provided as any of the previously described semiconductor switching devices that are used in power converting circuits. The anode of gate turn-off device 300 is connected to bus 236, while the cathode of gate turn-off device 302 is connected to bus 238. The cathode and anode of gate turn-off devices 300 and 302, respectively, are connected together and to inverter output terminal $M_1$. Diodes 304 and 306 are respectively connected across gate turn-off devices 300 and 302. The cathode of diode 304 is connected to bus 236, while the anode of diode 306 is connected to bus 238. The anode and cathode of diodes 304 and 306, respectively, are connected together and to inverter output terminal $M_1$.

Diodes 304 and 306 are included in each inverter circuit pole to provide a current path, in parallel with each gate turnoff device, that is in a direction opposite to an intended conduction direction of the associated gate turn-off device. Each diode 304 and 306 provides a path for reactive load current to flow from a load connected to the inverter output terminals to the power source, to which inverter circuit 204 is connected, to bypass the gate turn-off device. While diodes 304 and 306 are required for the operation of voltage source inverter circuit 204 illustrated in FIGS. 2 and 3, it will be understood by those skilled in the art that such diodes may not be required for the proper operation of switching devices in other types of power converting circuits.

Inverter pole 230 further includes a snubber circuit 310 connected across gate turn-off device 300 and constructed in accordance with the present invention. A snubber circuit 312 is connected across gate turn-off device 302 and is constructed substantially identically to snubber circuit 310. For convenience, only snubber circuit 310 is described in detail.

In accordance with the present invention, the snubber circuit includes capacitance means for charging with current bypassing the switching device when the switching device is turned off. As embodied herein, the capacitance means is provided, in snubber circuit 310, as a snubber capacitor 320. A first terminal of snubber capacitor 320 is connected to the anode of gate turn-off device 300. A second terminal of capacitor 320 is connected to the anode of a diode 322. The cathode of diode 322 is connected to the common point between gate turn-off devices 300 and 302. Snubber circuit 310 also includes a transformer 324 having a primary winding 326 and a secondary winding 328. The polarities of windings 326 and 328 are indicated by conventional dot designations in FIG. 3. Primary winding 326 is coupled in series with capacitor 320. In the embodiment illustrated in FIG. 3, a first terminal of primary winding 326 is connected at a point between capacitor 320 and the anode of diode 322. A second terminal of primary winding 326 is connected to the cathode of a diode 330. The anode of diode 330 is connected to a point between the cathode of diode 322 and the common point between gate turn-off devices 300 and 302.

A first terminal of secondary winding 328 is connected in common with the first terminal of capacitor 320 and the anode of gate turn-off device 300.

In accordance with the present invention, the snubber circuit includes inductance means for regulating the flow of discharge current from the capacitance means. As embodied herein, the inductance means is provided as an inductor 332 coupled in series with secondary winding 328. In the embodiment illustrated in FIG. 3, inductor 332 is connected between a second terminal of secondary winding 328 and the cathode of a diode 334. The anode of diode 334 is connected to second output leg 240 of inverter pole 230.

In operation, the gate turn-off devices of the respective inverter poles of power converting circuit 200 are controlled to turn on and off in a predetermined manner, known in the art, to provide a desired AC voltage on inverter output terminal M$_1$, M$_2$ and M$_3$. Since the respective snubber circuits of the three inverter poles 230, 232 and 234 are the same, the operation of the respective snubber circuits is described with respect to snubber circuit 310. When gate turn-off device 300 is turned off, a current commences to flow through capacitor 320, thereby charging the capacitor. This current flow has the effect of reducing, i.e., snubbing, the rate of change of voltage across gate turn-off device 300 when it is turned off. The rate at which capacitor 320 charges is determined primarily by the value of its capacitance and the current that the gate turn-off device is conducting at the instant it is turned off. In accordance with conventional practice, it is preferred that capacitor 320 be fully charged by the time gate turn-off device 300 is turned on, i.e., is closed.

Figure 4:
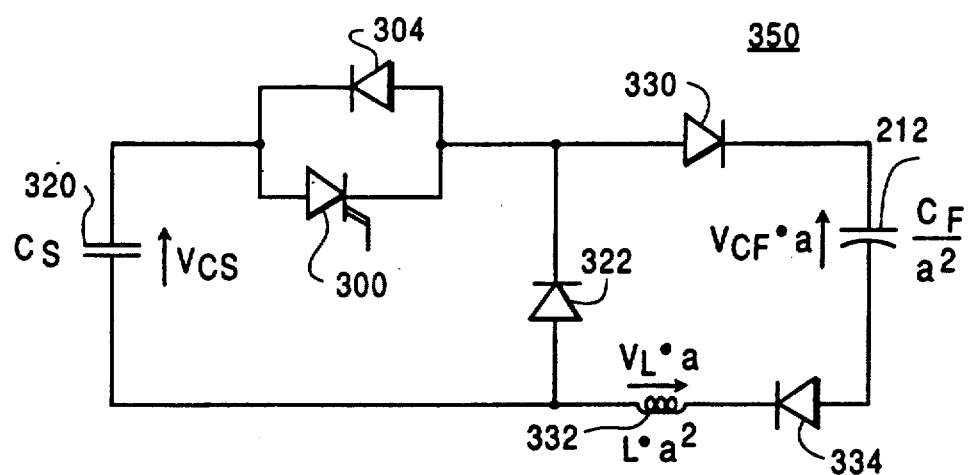
FIG. 4 illustrates an equivalent circuit for representing the discharge of a snubber capacitor.

The operation of snubber circuit 310 when gate turn-off device 300 is turned on is described in detail with reference to FIGS. 4–6B. FIG. 4 illustrates an equivalent circuit 350 of the portion of inverter pole 230 including gate turn-off device 300 and snubber circuit 310. The circuit elements illustrated in FIG. 4 are labeled with the same reference numerals as used in FIG. 3. Capacitance values of $C_F$ and $C_S$ are respectively assigned to capacitors 212 and 320. An inductance value of L is assigned to inductor 332.

Transformer 324 has been eliminated in equivalent circuit 350 and capacitor 212 and inductor 332 have been referred to the primary side of the transformer. A primary-to-secondary turns ratio of "a" is assumed for the transformer. As a result, capacitor 212 is illustrated in equivalent circuit 350 as having the value $C_F/a^2$ and inductor 332 is illustrated as having the value $L \cdot a^2$. The voltages across capacitors 212 and 320, at any instant, are respectively designated $V_{CF} \cdot a$ and $V_{CS}$ with the polarities shown in FIG. 4. The voltage across inductor 332, at any instant, is designated $V_L \cdot a$. The construction of equivalent circuit 350 is based on the simplifying assumption that transformer 324 is modeled as an "ideal" transformer. Such an ideal transformer has zero leakage inductances, an infinite magnetizing inductance and zero winding resistances.

FIGS. 5A–5D respectively illustrate graphical plots of different currents and voltages in circuit 350, as a function of time, that occur after gate turn-off device 300 is turned on. It is assumed that just prior to turning on gate turn-off device 300 at a time $t_1$, capacitor 320 is fully charged.

Figure 5A:
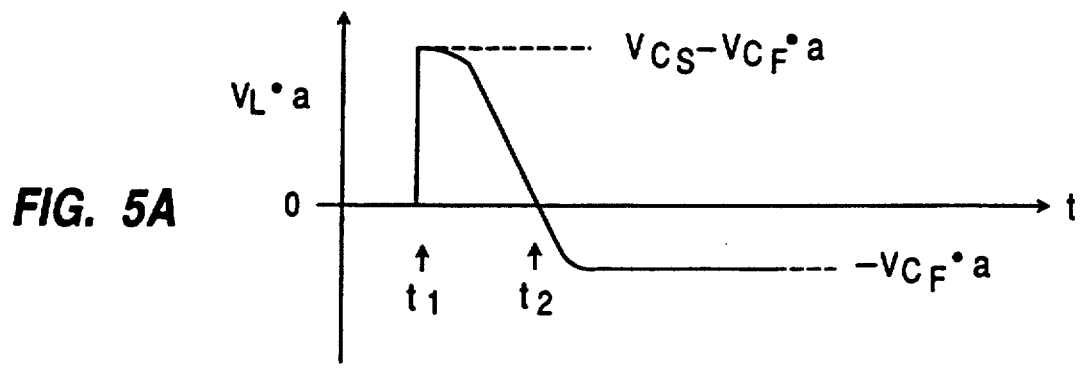
FIGS. 5A–5D illustrate plots, as a function of time, of different voltages and currents that occur in the equivalent circuit illustrated in FIG. 4.

FIG. 5A illustrates that at time $t_1$ when gate turn-off device 300 is turned on, the voltage $V_L \cdot a$ across inductor 332, in equivalent circuit 350, is substantially equal to $V_{CS} - V_{CF} \cdot a$. As seen in FIG. 5C, the voltage $V_{CS}$ across capacitor 320 is at a maximum value at time $t_1$. Upon turning on gate turn-off device 300, voltage $V_{CS}$ of capacitor 320 is applied across transformer 324 and capacitor 320 commences discharging through transformer 324 and inductor 332 to capacitor 212.

Figure 5B:
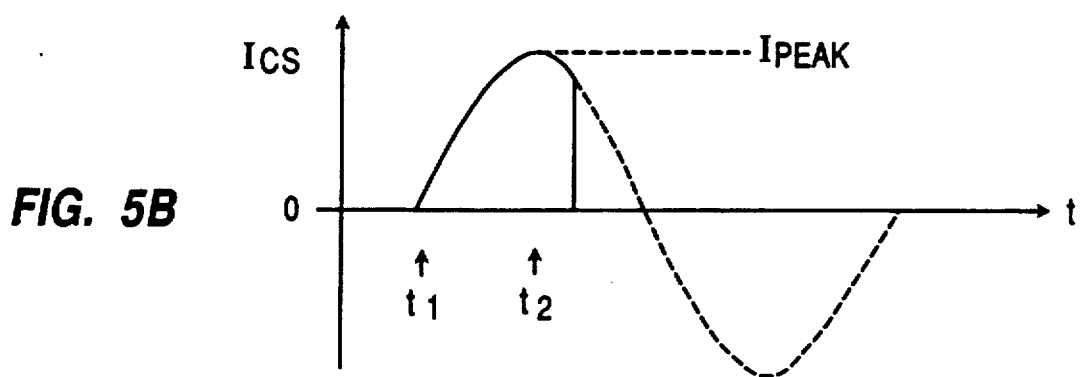
Figure 5C:
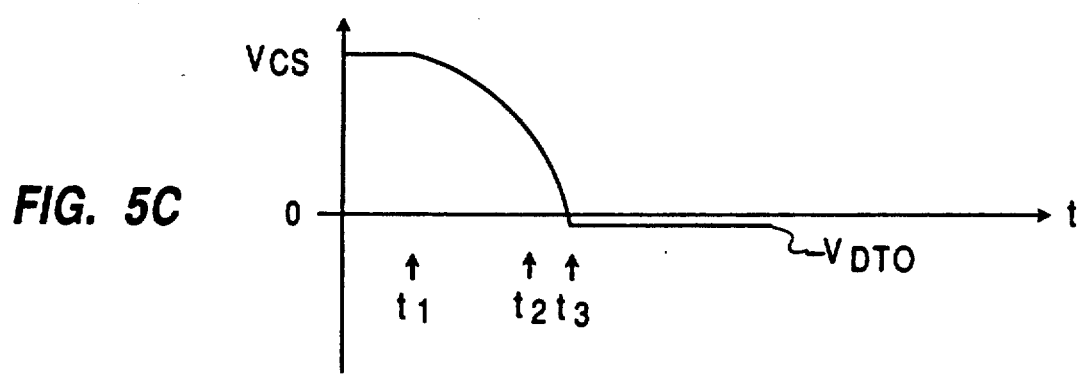
Figure 5D:
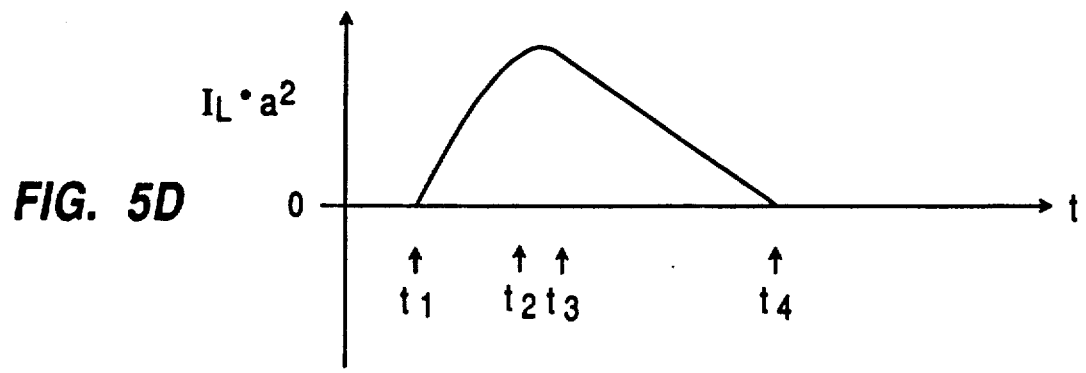

FIG. 5D illustrates the increase in the magnitude of current flowing through inductor 332 commencing at time $t_1$ when gate turn-off device 300 is turned on.

FIG. 5B illustrates a discharge current $I_{CS}$ that flows through capacitor 320. The current $I_{CS}$ increases with a sinusoidal characteristic that is determined by the series resonant circuit formed by capacitor 320 and inductor 332. The current $I_{CS}$ reaches a peak value $I_{PEAK}$ illustrated in FIG. 5B and having a value given by equation (1):

$$I_{PEAK} = (V_{CS} - V_{CF} \cdot a)\sqrt{C_s/(L\ a^2)}\ . \tag{1}$$

The frequency of oscillation f of the current $I_{CS}$ is given by equation (2):

$$f = 1/(2\ \pi\ a\ \sqrt{(LS_s)}). \tag{2}$$

The value $I_{PEAK}$ is reached at a time $t_2$ which is one-fourth the period of the sinusoidal waveform and is given by equation (3):

$$t_2 = (\pi a/2)\sqrt{LC_s} \quad (3)$$

FIG. 5C illustrates the decay of the voltage across capacitor 320, commencing at time $t_1$, as the capacitor discharges. FIG. 5A illustrates the corresponding decrease in the voltage across inductor 332 as capacitor 320 discharges.

Figure 6A:
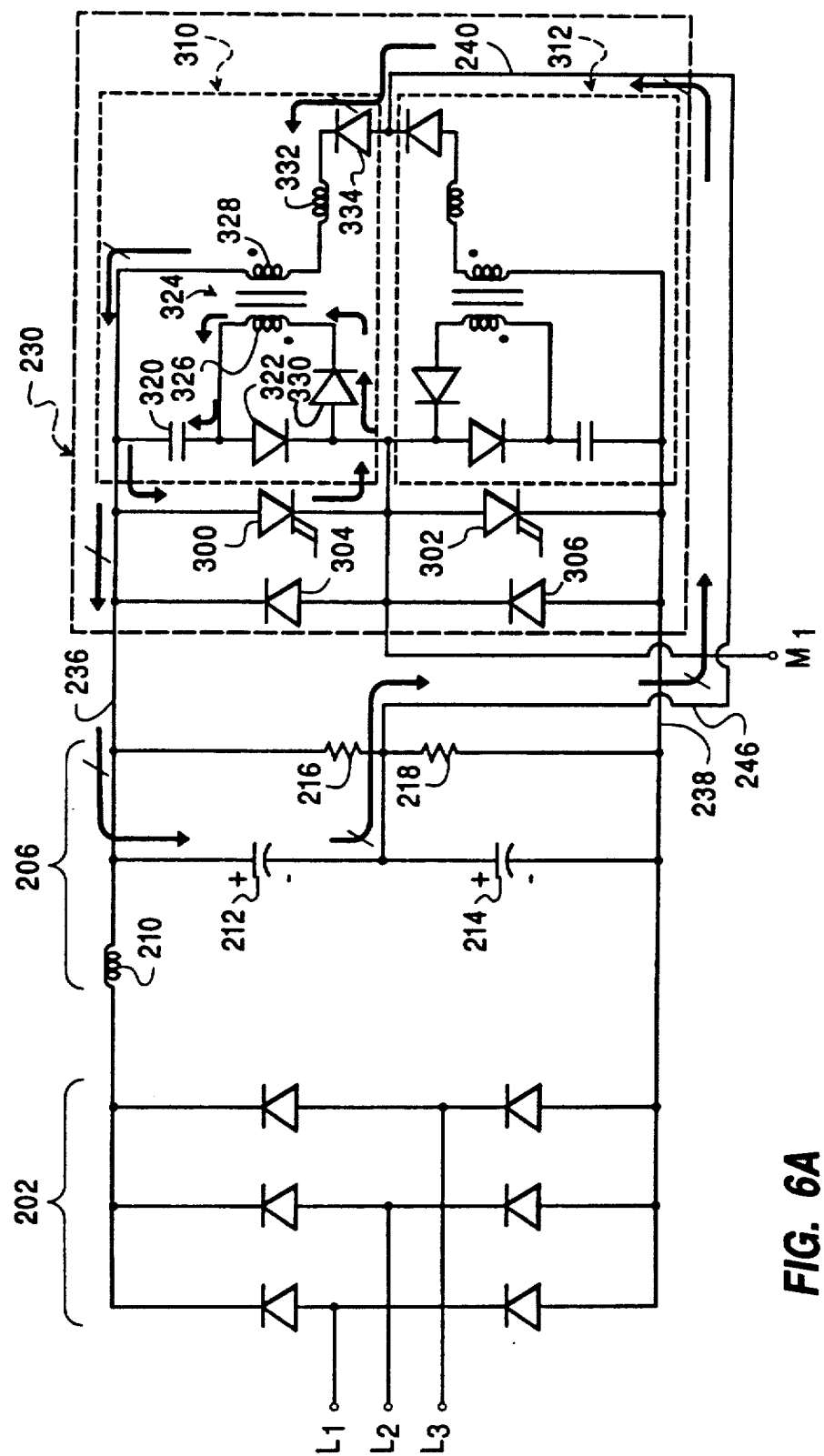
FIGS. 6A and 6B illustrate current paths, in the inverter pole illustrated in FIG. 3, that result from discharging the snubber capacitor.

FIG. 6A illustrates the paths followed by currents flowing on the primary and secondary sides of transformer 324 due to the discharge of capacitor 320 commencing at time $t_1$. The current path through secondary winding 328 of transformer 324 is indicated by arrows each having a single crosshatch. The current path including primary winding 326 and capacitor 320 is indicated by arrows without a crosshatch. As can be seen, the current path that includes secondary winding 328 also includes capacitor 212. In this manner, the energy stored in capacitor 320 is transferred through transformer 324 and delivered to capacitor 212. The turns ratio of transformer 324 is selected to provide a sufficiently high voltage on secondary winding 328 to drive the current flow through capacitor 212.

While gate turn-off device 300 is on, capacitor 320 continues to discharge. After capacitor 320 is fully discharged to 0 volts, current continues to flow through capacitor 320 until diode 322 becomes forward biased. This continued flow of current has the effect of charging capacitor 320 to a small negative polarity opposite to the positive polarity that capacitor 320 had when it was charged upon the turning off of gate turn-off device 300. However, capacitor 320 only charges to the small negative polarity, designated $-V_{DTO}$ in FIG. 5C, which is equal to the turn-on voltage of diode 322. Voltage $-V_{DTO}$ illustrated in FIG. 5C, can have a value of approximately $-0.5$ volts and is assumed to be effectively 0 for describing the operation of snubber circuit 310.

While at time $t_3$ all energy has been removed from capacitor 320, that energy has been transferred to capacitor 212 via inductor 332. As seen in FIG. 5D, at time $t_3$, a current continues to flow in inductor 332 indicating that the transfer of energy to capacitor 212 is not yet complete. At this time, the voltage across inductor 332, in equivalent circuit 400, is substantially equal to the voltage across capacitor 212, i.e., $-V_{CF}a$. As a result, the decay of the remaining energy in inductor 332 occurs at a linear rate given by equation (4):

$$di/dt = -V_{CF}/(a\cdot L) \quad (4)$$

This linear decay rate is indicated by the negative sloped, straight line decay illustrated between times $t_3$ and $t_4$ in FIG. 5D.

Figure 6B:
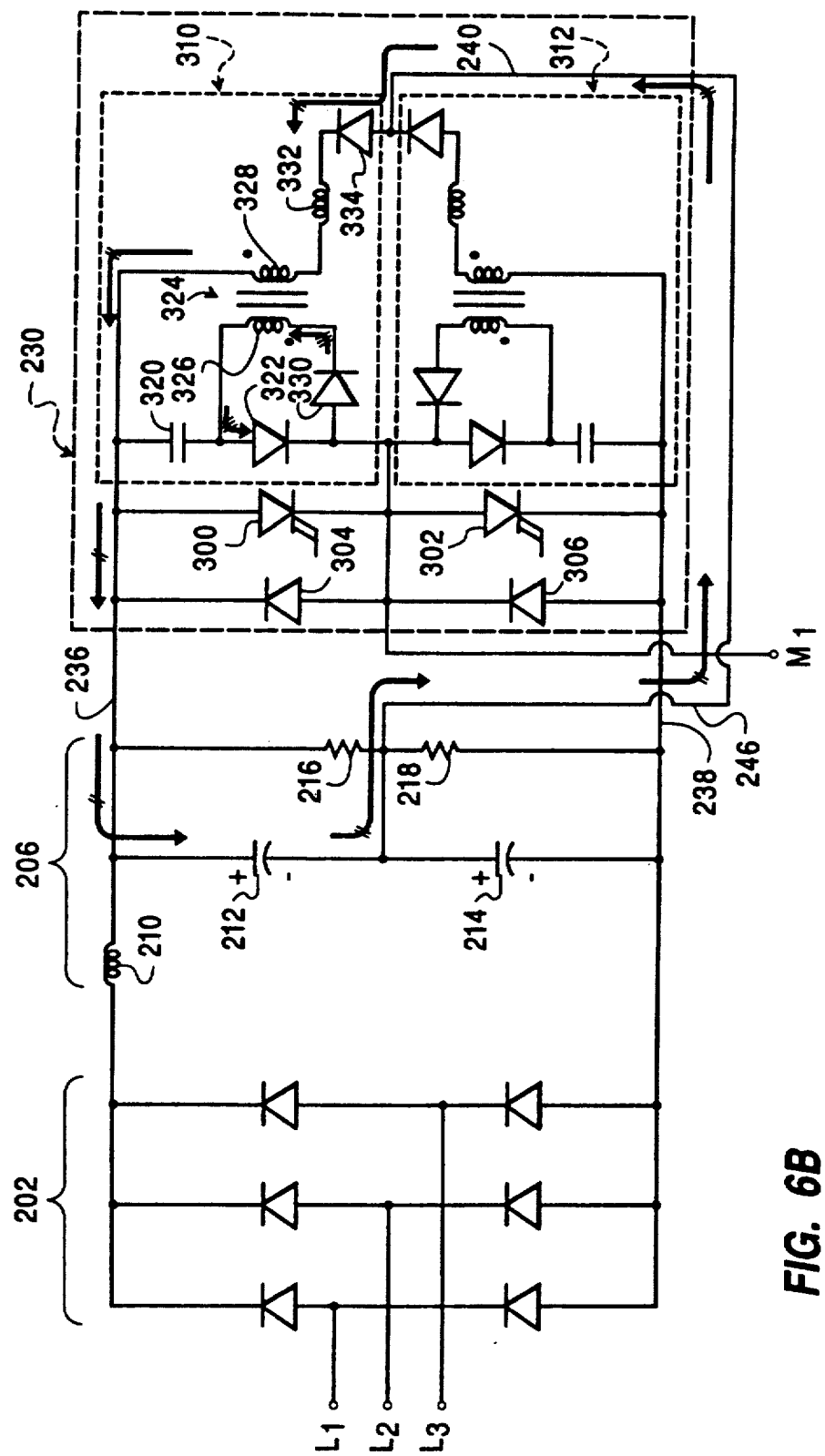

FIG. 6B illustrates the paths of current flow representing the depletion of the remaining energy stored in inductor 332 commencing at time $t_3$. The current path by which the remaining energy stored in inductor 332 is transferred to capacitor 212 is indicated by arrows each having a double crosshatch. The flow of this current through secondary winding 328 induces a current in primary winding 326 of transformer 324. This latter current circulates through primary winding 326 and diodes 322 and 330 and is illustrated in FIG. 6B by arrows each having a triple crosshatch.

In accordance with a preferred practice of the present invention, gate turn-off device 300 would not be turned off before time $t_4$. However, the switching rate of the gate turn-off devices of inverter circuit 204 is determined by the character of the power to be delivered on output terminals $M_1$, $M_2$ and $M_3$. Therefore, the elements of snubber circuits 310 are preferably selected to provide for the complete transfer of energy to capacitor 212 before the time at which gate turn-off device 300 is turned off. The effect of the parameters of snubber circuit 310 on the time required for completely transferring the energy stored in capacitor 320 to capacitor 212 is readily apparent from the above equations (1)–(4).

The transfer of energy to capacitor 212 represents a return of energy to the power source to which inverter circuit 204 is connected. Further, the transfer of energy to capacitor 212 results in correspondingly less power being drawn from the three-phase AC source connected to the input of power converting circuit 200. As a result, the transfer of energy from snubber circuit 310 to capacitor 212 is effectively a transfer of energy to the power source to which power converting circuit 200 is connected.

Without limitation, an inverter circuit having a DC input voltage rating of 620V, a three-phase output voltage rating of 460V and a power rating of 215 kVA, may be constructed with components having the following characteristics:

| | |
|---|---|
| inductor 210 | 200 $\mu$H |
| capacitor 212, 214 | 21,600 $\mu$F |
| resistors 216, 218 | 2K ohms, 100 watts |
| gate turn-off devices 300, 302 | 600 A, 1200 V |
| diodes 304, 306 | 85 A, 1200 V |
| capacitor 320 | 2 $\mu$F, 1200 V |
| diode 322 | 85 A, 1200 V |
| diode 330 | 17 A, 1200 V |
| diode 334 | 17 A, 1600 V |
| inductor 332 | 65 $\mu$H, 10 A |
| transformer 324 | |
| maximum primary or secondary leakage inductance | 5.4 $\mu$H |
| magnetizing inductance | 1.8 mH |
| primary resistance | 29 m$\Omega$ (D.C.) |
| secondary resistance | 116 m$\Omega$ (D.C.) |
| maximum repetition rate | 800 Hz |
| VA rating | 1.8 kVA |
| turns ratio (primary:secondary) | 1:2.2 |

Transformer 324 having the characteristics listed above is available from the Forest Electric Company of Melrose Park, Ill., as Model No. PX-1.

While the snubber circuit of the present invention has been illustrated and described with respect to snubber circuit 210, the invention is not so limited. Throughout the transfer of energy to capacitor 212, current flows through primary winding 326 of transformer 324. This current flow results in a net storage of a small amount of energy in primary winding 326 due to the non-ideal characteristics of transformer 324. As seen in FIG. 6B, a current circulates through primary winding 326 and diodes 322 and 330 while the energy stored in inductor 332 is transferred to capacitor 212. When the energy stored in inductor 332 is depleted and the current through inductor 332 ceases to flow at time $t_4$, a small circulating current continues to flow in the loop formed by primary winding 326 and diodes 322 and 330. This current flow is driven by the energy that remains stored in primary winding 326. As a result of this current flow, the voltage across primary winding 326 is approximately equal to the sum of the respective turn-on voltages of diodes 322 and 330. For the exemplary circuit elements listed above, this results in a voltage of approximately 1.4 volts across the transformer primary winding 326. In snubber circuit 310, the energy in transformer winding 326 is depleted at a rate $di_T/dt$ that is primarily determined by the magnetizing inductance $L_M$ of transformer 324 and the small voltage $V_{PW}$ across the primary winding. This depletion rate can be expressed by the following equation:

$$di_T/dt = V_{PW}/L_M \quad (5)$$

If the switching rate of the gate turn-off devices of inverter circuit 204 is sufficiently slow, the energy in primary winding 326 will be completely depleted before gate turn-off device 300 is turned off. However, if the switching rate requires gate turn-off device 300 to turn off before the energy stored in primary winding 326 is fully depleted, a small net current will flow through primary winding 326 throughout the operation of inverter 204. This net current will result in a resistive loss in primary winding 326 that is a function of the magnitude of the current and the winding resistance. If the winding resistance is sufficiently low, the magnitude of this loss and the heating caused by it are negligible. The exemplary transformer described above has a sufficiently low primary winding resistance to result in negligible losses and heating. A typical loss value is 11.6 watts for a winding resistance of 0.029 ohms.

Figure 7:
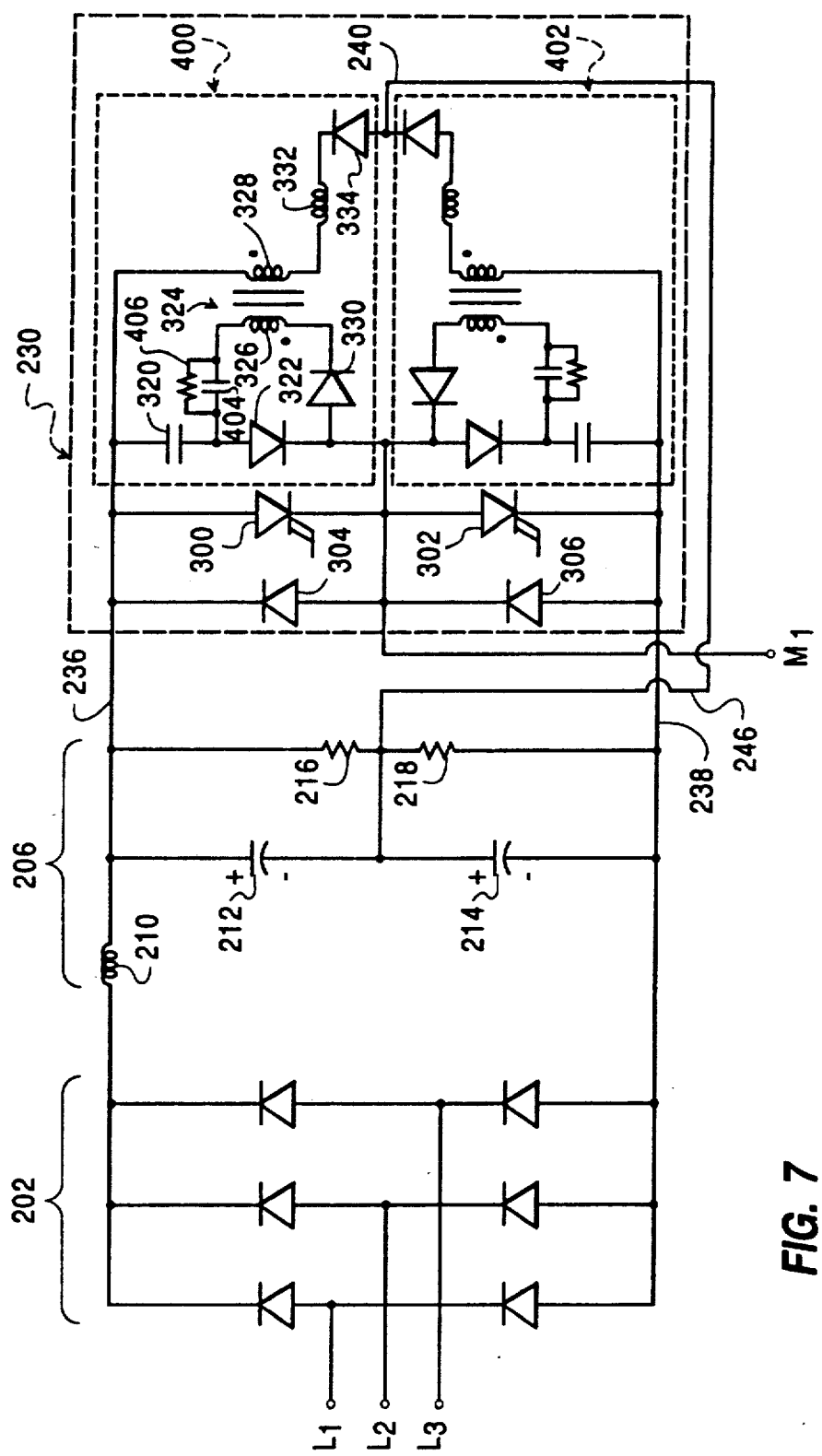
FIG. 7 illustrates an inverter pole of the power converting circuit illustrated in FIG. 2 including a snubber circuit constructed in accordance with a second embodiment of the invention.

Alternatively, if the transformer is not provided with a sufficiently low primary winding resistance, the resultant heating may adversely affect the operating temperature of the transformer. FIG. 7 illustrates a second embodiment of the invention in which snubber circuits 400 and 402 are provided in inverter pole 230. Each snubber circuit 400 and 402 is substantially identical to snubber circuit 310 except for addition of a resistor 406 and a capacitor 404 connected in parallel with each other and in series with primary winding 326. In the illustrated embodiment, resistor 406 and capacitor 404 are connected between primary winding 326 and the anode of diode 322.

In operation, snubber circuit 400 operates substantially the same as was illustrated and described above for snubber circuit 310. However, the flow of current through primary winding 326 causes capacitor 404 to be charged in a direction that depletes the energy stored in transformer 324 once transfer of energy from capacitor 320 to capacitor 212 is complete. In accordance with a preferred practice of this embodiment of the invention, the capacitance value of capacitor 404 is chosen such that the voltage to which capacitor 404 charges during the interval between times $t_1$ and $t_3$ (FIG. 5C) is substantially less than the value of $V_{CS}$ at time $t_1$. The value of resistor 406 is chosen to deplete the charge on capacitor 404 prior to the next discharging cycle. The volt-second area of the resistor 406/capacitor 404 combination is chosen to exceed the volt-second area of primary winding 326 during the interval between times $t_1$ and $t_4$ (FIG. 5D). The energy stored in capacitor 404 is dissipated primarily in resistor 406 in a time determined by the time constant of the RC circuit formed by capacitor 404 and resistor 406.

As a result, operation of inverter 204 including the snubber circuit of the second embodiment of the invention, results in relatively small losses. In one exemplary circuit, capacitor 404 is provided with a rating of 40 $\mu$F and 100 volts and resistor 406 is provided with a rating of 4.7 ohms and 60 watts. At an inverter pole switching rate of 800 Hz, the loss in resistor 404 is approximately 36 watts.

Figure 8:
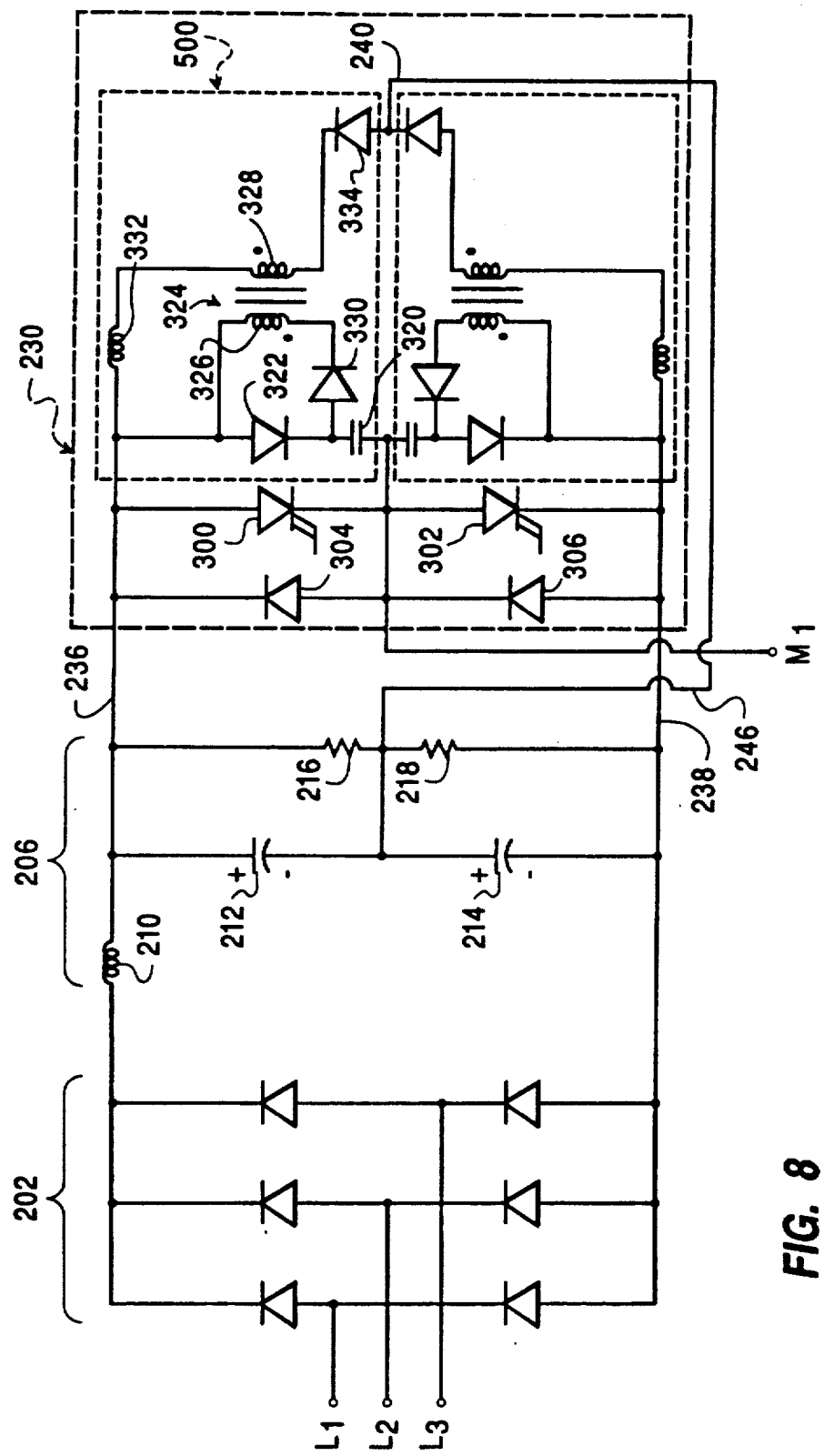
FIG. 8 illustrates a modification to the snubber circuit illustrated in FIG. 3.

While the snubber circuit of the present invention has been illustrated and described with respect to snubber circuits 310 and 400, the invention is not so limited. Snubber circuit 310 can be reconfigured as snubber circuit 500, illustrated in FIG. 8, in which the positions of capacitor 320 and inductor 332 are modified. Snubber circuit 500 operates substantially identically to circuit 310. Further, the snubber circuit can be constructed such that only one of capacitor 320 and inductor 332 is relocated as illustrated in FIG. 8, without modifying the manner in which the snubber circuit operates.

Figure 9:
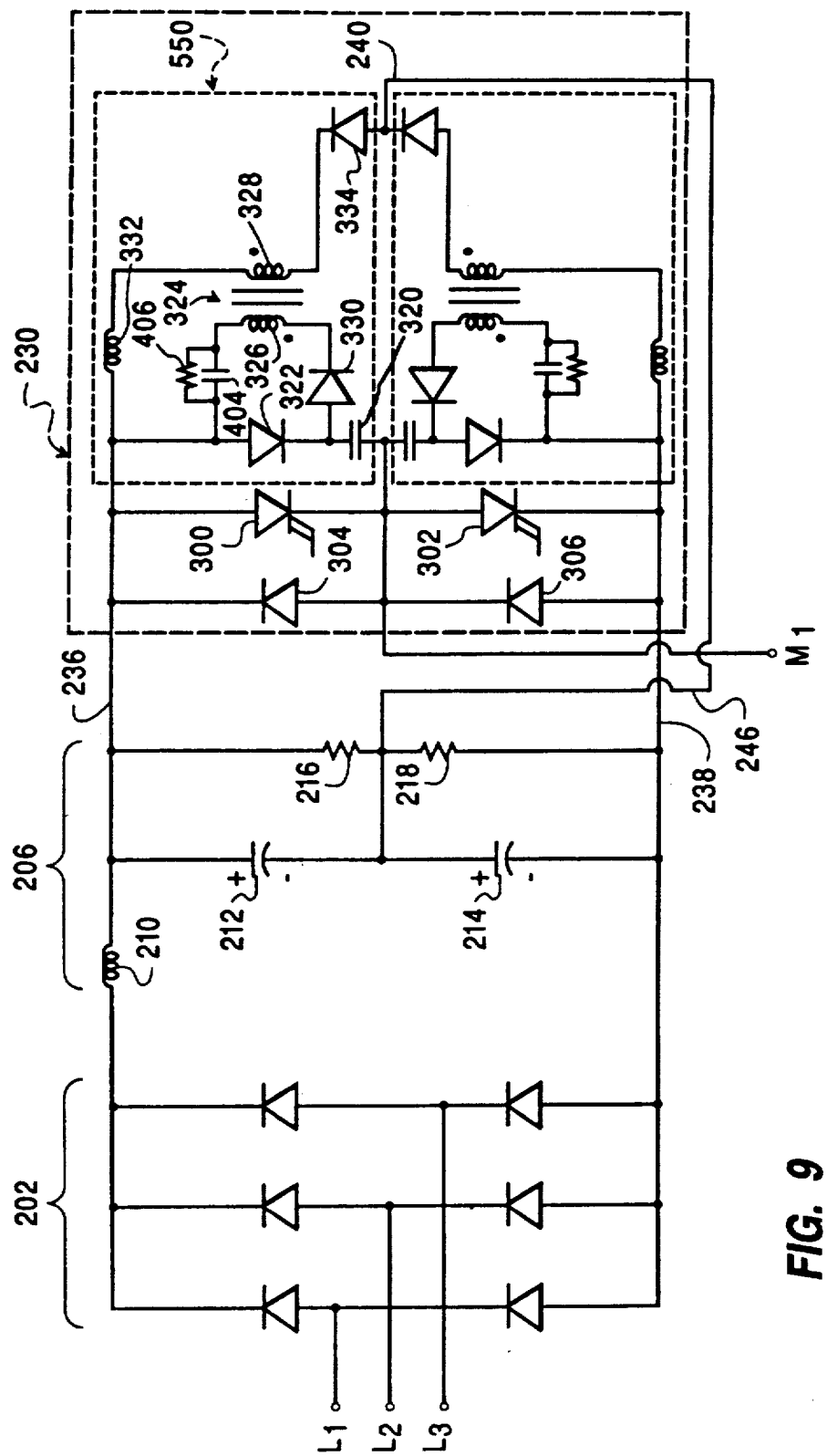
FIG. 9 illustrates a modification to the snubber circuit illustrated in FIG. 7.

FIG. 9 illustrates a snubber circuit 550 which represents a modification to snubber circuit 400 achieved by relocating capacitor 320 and inductor 332. Snubber circuit 550 operates substantially identically to snubber circuit 400. Further, snubber circuit 400 can be modified so that only one of capacitor 320 and inductor 332 is relocated in the manner shown in snubber circuit 550, without altering the operation of the circuit.

Figure 10:
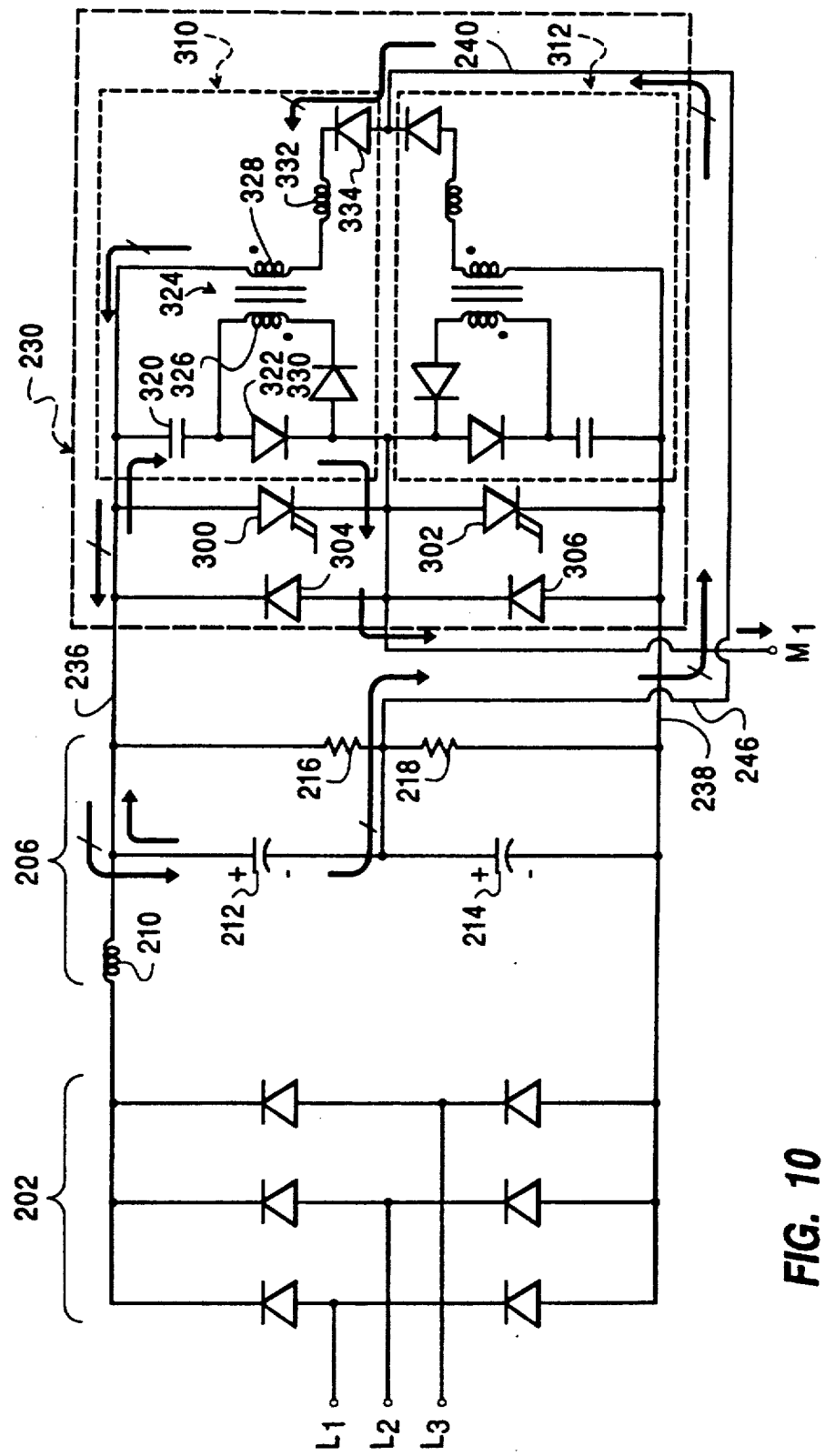
FIG. 10 illustrates current paths, in the inverter pole illustrated in FIG. 3, that result from turning off the gate turn-off device.

While the operation of the snubber circuit of the present invention has been described with respect to not turning off device 300 before time $t_4$ (FIG. 5D), the invention is not so limited. It is possible to operate inverter circuit 204 with gate turn-off device 300 being turned off at time $t_3$ (FIGS. 5C and 5D) when capacitor 320 is fully discharged but inductor 332 still stores energy. Commencing with the turning off of device 300 at time $t_3$, capacitor 320 begins to charge and an additional current flows that is caused by depletion of the energy remaining in inductor 332 at time $t_3$. FIG. 10 illustrates the paths of current flow that would be present following turning off of device 300 at time $t_3$. The current path by which capacitor 320 is charged is indicated by arrows without a crosshatch. The current path associated with depleting the energy in inductor 332 is indicated by arrows with a single crosshatch. The rate at which the energy in inductor 332 is depleted is determined by the voltage across the inductor, which is $-V_{CF}/(aL)$. For switching rates normally experienced in power converting circuits, all energy in inductor 332 will be depleted before the next gating on of gate turn-off device 300.

While the operation of the snubber circuit of the present invention ha been illustrated and described for application in an inverter circuit, the invention is not so limited. As those skilled in the art will now appreciate, the snubber circuit of the present invention can readily be applied to the switching devices of any power converting circuit with the result that the above-described advantages derived from operation of the inventors' snubber circuit will be realized.

While the snubber circuit of the present invention has been described with respect to a power converting circuit including filter capacitors to which energy stored in the snubber circuits is transferred, the invention is not so limited. The snubber circuit of the present invention can be practiced with equal effectiveness in other power converting circuits including elements, such as a battery, that can receive and store energy transferred from the snubber circuit.

Thus, it is intended that the present invention cover the modifications and the variations of the invention provided they come within the scope of the appended claims an equivalents.

What is claimed is:

1. A snubber circuit for use in a power converting circuit including an input for coupling to a source of power and an output for coupling to a load to which converted power is to be delivered, the power converting circuit further including at least one power semiconductor switching device coupled between the input and the output of the converting circuit, said switching device being turned on and off to selectively conduct current through the power converting circuit, said snubber circuit comprising:

capacitance means, coupled across the switching device, for charging with current bypassing the switching device when the switching device is turned off;

a voltage transformer having a primary winding and a secondary winding, said primary winding being coupled in series with said capacitance means to conduct a flow of current discharged by said capacitance means when the switching device is turned on;

inductance means, coupled in series with said secondary winding of said transformer, for forming a resonant circuit with said capacitance means to regulate the flow of discharge current from said capacitance means; and circuit means, coupled to the power converting circuit input and said inductance means, for conducting the current flowing through said inductance means and said secondary winding of said snubber circuit, and returning energy stored in said capacitance means to the power source;

so that energy stored in said capacitance means is transferred to the power source through said transformer and said inductance means at a rate determined by said resonant circuit when the switching device is turned on.

2. The snubber circuit of claim 1 further including first rectifying means, coupled across the primary winding of said transformer, for constraining to a single direction the flow of discharge current from said capacitance means through said primary winding.

3. The snubber circuit of claim 2 further including second rectifying means coupled in series with said inductance means and said secondary winding, for constraining to a single direction the flow of discharge current through said inductance means.

4. The snubber circuit of claim 3 wherein the power converting circuit includes third rectifying means, coupled across the switching device, for providing a path for load current to flow from the load to the source to bypass the switching device.

5. The snubber circuit of claim 1 further including rectifying means, coupled in series with said inductance means and said secondary winding, for constraining to a single direction the flow of discharge current through said inductance means.

6. The snubber circuit of claim 1 further including means, coupled in series with said primary winding, for increasing a rate of depleting energy stored in said primary winding after said capacitance means has been discharged.

7. The snubber circuit of claim 6 wherein said rate increasing means includes a capacitor.

8. The snubber circuit of claim 3 further including means, coupled in series with said primary winding, for increasing a rate of depleting energy stored in said primary winding after said capacitance means has been discharged.

9. The snubber circuit of claim 8 wherein said rate increasing means includes a capacitor.

10. A snubber circuit for use in a power converting circuit including an input for coupling to a source of power and an output for coupling to a load to which converted power is to be delivered, the power converting circuit further including at least one power semiconductor switching device having a first terminal coupled to the input of the converting circuit and a second terminal coupled to the output of the converting circuit, said switching device being turned on and off to selectively conduct current through the power converting circuit, said snubber circuit comprising:

a capacitor for charging with current bypassing the switching device when the switching device is turned off;

a voltage transformer having a primary winding and a secondary winding;

said capacitor coupled in series combination with said transformer primary winding, said series combination being coupled across said first and second terminals of said switching device, so that said primary winding conducts a flow of current discharged from said capacitor when the switching device is turned on;

an inductor, coupled in series with said secondary winding of said transformer, for forming a resonant circuit with said capacitor to regulate the flow of discharge current from said capacitor when the switching device is turned on; and circuit means, coupled to the power converting circuit input and said inductor, for conducting the current flowing through said inductor and said secondary winding of said snubber circuit, and returning energy stored in said capacitor to the power source;

so that energy stored in said capacitor is transferred to the power source through said transformer and said inductor at a rate determined by said resonant circuit when the switching device is turned on.

11. The snubber circuit of claim 10 wherein a first terminal of said capacitor is coupled to said first terminal of the switching device and a second terminal of said capacitor is coupled to a first terminal of said primary winding of said transformer;

said snubber circuit further including:

a first diode having an anode coupled to the second terminal of said capacitor; and a second diode having an anode coupled to a cathode of said first diode and to the second terminal of the switching device, a cathode of said second diode being coupled to a second terminal of said primary winding of said transformer;

so that said first and second diodes constrain to a single direction the flow of discharge current through said primary winding.

12. The snubber circuit of claim 11 further including a third diode, coupled in series with said inductor and said secondary winding, for constraining to a single direction the flow of discharge current through said inductor.

13. The snubber circuit of claim 12 wherein the power converting circuit includes a fourth diode, coupled across the switching device, for providing a path for load current to flow from the load to the source to bypass the switching device.

14. The snubber circuit of claim 10 further including a diode, coupled in series with said inductor and said secondary winding, for constraining to a single direction the flow of discharge current through said inductor.

15. The snubber circuit of claim 10 further including means, coupled in series with said primary winding, for increasing a rate of depleting energy stored in said primary winding after said capacitor has been discharged.

16. The snubber circuit of claim 15 wherein said capacitor is a first capacitor; and
said rate increasing means includes a second capacitor.

17. The snubber circuit of claim 12 further including means, coupled in series with said primary winding, for increasing a rate of depleting energy stored in said primary winding after said capacitor has been discharged.

18. The snubber circuit of claim 17 wherein said capacitor is a first capacitor; and
said rate increasing means includes a second capacitor.

19. The snubber circuit of claim 10 wherein a first terminal of said capacitor is coupled to the second terminal of the switching device;
said snubber circuit further including:
a first diode having a cathode coupled to a second terminal of said capacitor and an anode coupled to both the first terminal of the switching device and a first terminal of said primary winding;
a second diode having an anode coupled to both said second terminal of said capacitor and said anode of said first diode, a cathode of said second diode being coupled to a second terminal of said primary winding; and
so that said first and second diodes constrain to a single direction the flow of discharge current through said primary winding.

20. The snubber circuit of claim 19 further including a third diode, coupled in series with said inductor and said secondary winding, for constraining to a single direction the flow of discharge current through said inductor.

21. The snubber circuit of claim 20 wherein the power converting circuit includes a fourth diode, coupled across the switching device, for providing a path for load current to flow from the load to the source to bypass the switching device.

22. The snubber circuit of claim 20 further including means, coupled in series with said primary winding, for increasing a rate of depleting energy stored in said primary winding after said capacitor has been discharged.

23. The snubber circuit of claim 22 wherein said capacitor is a first capacitor; and
said rate increasing means includes a second capacitor.

24. A power converting circuit, comprising:
an input for coupling to a source of power;
an output for coupling to a load to which converted power is to be delivered;
at least one power semiconductor switching device coupled between said input and said output of said power converting circuit, said switching device being turned on and off to selectively conduct current through the power converting circuit; and
snubber means, coupled to said switching device, for limiting a voltage change rate across said switching device when said switching device is turned off;
said snubber means comprising:
capacitance means, coupled across said switching device, for charging with current bypassing said switching device when said switching device is turned off;
a voltage transformer having a primary winding and a secondary winding, said primary winding being coupled in series with said capacitance means to conduct a flow of current discharged by said capacitance means when said switching device is turned on;
inductance means, coupled in series with said secondary winding of said transformer, for forming a resonant circuit with said capacitance means to regulate the flow of discharge current from said capacitance means; and
circuit means, coupled to the power converting circuit input and said inductance means for conducting the current flowing through said inductance means and said secondary winding of said snubber circuit, and returning energy stored in said capacitance means to the power source.

25. The power converting circuit of claim 24, said snubber means further including first rectifying means, coupled across said primary winding of said transformer, for constraining to a single direction the flow of discharge current from said capacitance means through said primary winding.

26. The power converting circuit of claim 25, said snubber means further including second rectifying means, coupled in series with said inductance means and said secondary winding, for constraining to a single direction the flow of discharge current through said inductance means.

27. The power converting circuit of claim 26 further including third rectifying means, coupled across said switching device, for providing a path for load current to flow from the load to the source to bypass said switching device.

28. The power converting circuit of claim 24, said snubber means further including rectifying means, coupled in series with said inductance means and said secondary winding, for constraining to a single direction the flow of discharge current through said inductance means.

29. The power converting circuit of claim 24, said snubber means further including means, coupled in series with said primary winding, for increasing a rate of depleting energy stored in said primary winding after said capacitance means has been discharged.

30. The power converting circuit of claim 29 wherein said rate increasing means includes a capacitor.

31. The power converting circuit of claim 26, said snubber means further including means, coupled in series with said primary winding, for increasing a rate of depleting energy stored in said primary winding after said capacitance means has been discharged.

32. The power converting circuit of claim 31 wherein said rate increasing means includes a capacitor.

33. A three-phase AC-to-AC power converting circuit, comprising:
rectifier circuit means, having an input for coupling to a three-phase AC voltage source, for rectifying the three-phase voltage of the AC source and providing a DC output voltage;
filter circuit means, coupled to receive the DC output voltage of said rectifier circuit means, for filtering the DC output voltage and providing on a filter output a filtered DC output voltage, said filter circuit means including at least one filter capacitor;

three-phase inverter circuit means, coupled to receive the filtered DC output voltage, for providing a three-phase AC output voltage on a three-phase AC output;

said inverter circuit means including three inverter pole circuits having respective inverter pole outputs that together form the three-phase AC output;

each said inverter pole circuit including at least one power semiconductor switching device coupled between the filter output and the inverter pole output, said switching devices of said respective inverter pole circuits being selectively turned on and off to convert the filtered DC output voltage to said three-phase Ac output, and snubber means, coupled to said switching device, for limiting a voltage change rate across said switching device when said switching device is turned off;

said snubber means comprising capacitance means, coupled across said switching device, for charging with current bypassing said switching device when said switching device is turned off;

a voltage transformer having a primary winding and a secondary winding, said primary winding being coupled in series with said capacitance means to conduct a flow of current discharged by said capacitance means when said switching device is turned on;

inductance means, coupled in series with said secondary winding of said transformer, for forming a resonant circuit with said capacitance means to regulate the flow of discharge current from said capacitance means; and circuit means for conducting current flowing through said inductance means and said secondary winding of said snubber means to said filter capacitor;

so that energy stored in said capacitance means is transferred to said filter capacitor through said transformer and said inductance means at a rate determined by said resonant circuit when said switching device is turned on.

34. The power converting circuit of claim 33 further including first rectifying means, coupled across said switching device, for providing a path for load current to flow from the load to the source to bypass said switching device;

said snubber means further including:

second rectifying means, coupled across said primary winding of said transformer, for constraining to a single direction the flow of discharge current from said capacitance means through said primary winding; and third rectifying means, coupled in series with said inductance means and said secondary winding, for constraining to a single direction the flow of discharge current through said inductance means.

* * * * *

UNITED STATES PATENT AND TRADEMARK OFFICE
CERTIFICATE OF CORRECTION

PATENT NO. : 5,075,838

DATED : December 24, 1991

INVENTOR(S) : Harold R. Schnetzka, II and Frank E. Wills

It is certified that error appears in the above-identified patent and that said Letters Patent is hereby corrected as shown below:

Claim 24, column 14, line 19, change "." to --;-- and insert
--so that energy stored in said capacitance means is
   transferred to the power source through said transformer
   and said inductance means at a rate determined by said
   resonant circuit when said switching device is turned on--

Claim 33, column 15, line 14, change "Ac" to --AC--.

Signed and Sealed this

Thirtieth Day of March, 1993

Attest:

STEPHEN G. KUNIN

*Attesting Officer*     *Acting Commissioner of Patents and Trademarks*